May 3, 1960 A. E. TOMKIN 2,935,194
PURITY INDICATOR FOR ION-EXCHANGE MATERIAL
Filed June 1, 1955
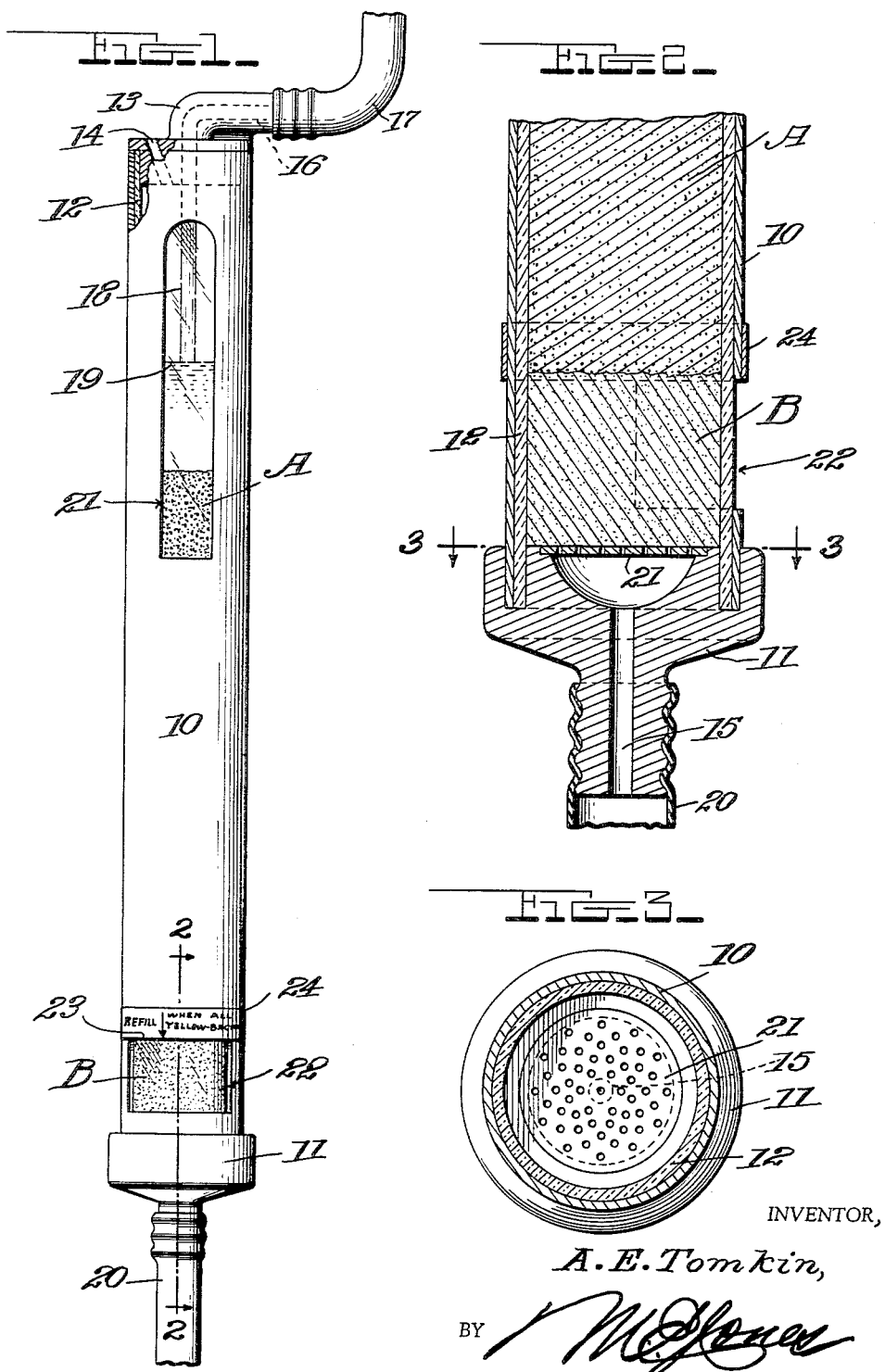
INVENTOR,
A. E. Tomkin,
BY
ATTORNEY.

United States Patent Office 2,935,194
Patented May 3, 1960

2,935,194
PURITY INDICATOR FOR ION-EXCHANGE MATERIAL

Abraham Emil Tomkin, Washington, D.C.

Application June 1, 1955, Serial No. 512,365

8 Claims. (Cl. 210—95)

This invention relates to a means of utilizing ion-exchange material in conjunction with color-changing dyed ion-exchange material as a purity indicator in the treatment of water and other liquids. The invention finds particular applications for such general uses where pure mineral-free water is required as for laboratories, photography, graphic arts, storage batteries, etc.

The instant application is a continuation-in-part of my application Serial No. 246,058, filed September 11, 1951, now abandoned, entitled Automatic Indicating Ion-Exchange Water Demineralizing.

The invention aims generally to utilize any ion-exchange material in combination with an indicating layer of color-changing dyed ion-exchange material to continuously check on the mineral purity of the effluent.

Natural water is an impure material containing dissolved mineral substances taken up from its contact environment. These dissolved mineral impurities make the raw water unsatisfactory for uses where controlled mineral pure water is required such as for storage batteries, laboratories, photography, etc.

A well established means to remove mineral impurities from natural water is by the use of ion-exchange material. By simply passing the water through a column of hydrogen-state cation resin and a column of base-state anion resin or through a mixed column of the cation and anion resins, the water is stripped of its dissolved mineral impurities. This procedure for the treatment of water for dissolved ionized impurities is now common practice. The purity of the treated or effluent water is generally indicated by electronic or other electrical instruments to measure the electrical resistance of the water. Although this method to determine water purity is satisfactory, the expense of the equipment or instruments limits or restricts the application to industrial or professional uses.

However, since there is a great need for pure water for such popular uses as for storage battery topping at automobile service stations and elsewhere, for photographic development, etc. where the use of expensive equipment may not be warranted, the users would primarily be interested only in an inexpensive means that would supply pure water on location at lost cost. This invention eliminates the need for any electrical instrument and permits the use of low-cost competitive ion-exchange materials.

The elimination of the electronic instrument indicator is effected by the use of any ion-exchange material in combination with a small separate layer of color-changing dyed ion-exchange material at the outlet or discharge end of the device. The major portion of the bed or column of material employed serves to effect the essential water purification throughout the run with the color-changing indicating layer (minor portion) to show end-purity (end-point) while it is being exhausted by an excess of cationic or anionic ion-exchange material (as the case may require) contained in the major portion.

The small separate indicating layer of the color-changing ion-exchange material at the discharge end serves essentially as a replacement for an electronic instrument indicator. Such color-changing ion-exchange material is a special controlled product as to color, uniformity and nature of the color-changing dye, while the bulk (major portion) of the ion-exchange bed can be competitive low-cost ion-exchange material. One way or means for carrying out the invention is shown without limitation to dimensions or proportions by way of example in the accompanying drawings wherein:

Fig. 1 is a view in elevation, partly broken away;

Fig. 2 is a fragmentary longitudinal sectional view taken on the line 2—2 of Fig. 1; and Fig. 3 is a cross-section taken on the line 3—3 of Fig. 2.

In said drawing 10 designates a cylindrical shell of opaque material, usually metal and for instance aluminum adapted to be mounted or supported in any suitable way as on a stand or from a wall. Said shell 10 is anchored usually permanently at its base or lower end in a fitting 11 usually of aluminum and also coextensively with its inner surface has an interior lining tube 12 of glass or clear plastic usually permanently secured to said fitting. At the top of shell 10 I provide a removable fitting 13 usually of aluminum which fits telescopically stopper-like frictionally into the lining and has a vent passage therethrough to insure proper internal pressure. Said fittings 11 and 13 are conduits as they have passages 15 and 16, respectively, so that fitting 16 may be connected to a water faucet (not shown) as by means of a flexible hose 17. The water enters in a stream 18, is maintained at the level 19, and flows downwardly successively through beds of ion-exchange material A and B, a perforated retaining plate 21 for said beds A and B, and discharges through fitting 11 aided, if desired, by a flexible hose 20 to any desired receptacle or point of use. Plate 21 is preferably of porcelain and anchored to fitting 11 so that the parts 10, 11, 12 and 21 are a water tight unit usually of inseparable parts.

Said material A is the major bed or cartridge of any desired ion-exchange material which removes dissolved ionized minerals from water according to the well-known principles of cation and anion exchanges plus a sufficient excess cation ion-exchange material (to exhaust said example indicating layer material B); while the smaller layer, body or cartridge of said material B is for example: a styrene divinyl benzene copolymer bearing quaternarized amine alkyl groups. This anion exchange resin is dyed with material such as thymolsulfonphthalein or thymolphthalein and changes from its original yellow or brown color to a deep dark blue color. A reverse color change takes place when the anion resin has exhausted its exchange capacity with a complementary loss of basicity.

Shell 10 has an upper opening or window at 21 through which intake conditions may be observed through the exposed clear or transparent lining tube 12 and adjacent its base shell 10 has an opening or window 22 through which the indicating layer B may be observed through the exposed clear lining tube 12. The upper horizontal portion of the wall surrounding opening 22 serves as a gauge for filling of the material B in the correct amount and coacting with said upper horizontal wall portion is a stripe 23 in distinct contrasting color. Said stripe 23 is delineated on a band 24 on which further delineated instructions in association with an arrow as shown to replenish the material A and material B when material or layer B color changes to that instructed. Said band and instructions conveniently can be compositively made from suitable plastic type material and adhered to the shell as shown.

In operation, raw water flows through the apparatus at such rate as to maintain an operating level such as 19 within the intake sight opening; or an overflow outlet (not shown) can be inserted at that level to maintain intake at that desired level. As such water flows down through the ion-exchange beds A and B in succession, the dissolved ionized minerals are removed by the cation and anion exchangers. As long as the treated water reaching the indicating layer is of sufficient or predetermined mineral-free purity, the indicating layer B does not change color. When the major bed or charge A of the ion-exchange material is exhausted (that is when the charge has taken up minerals to the limit of its practical working capacity), the excess cation exchange present of charge A converts the intake water to an acid condition (hydrogen of cation resin replaces the ionized cations of water). This acid water passes into the indicating layer B (anion exchanger) and starts to exhaust the indicating layer from the upper level downward. As the indicating material reaches exhaustion a color change takes place from the dyed dark blue to a yellow-brown. When a complete color change takes place, this is the signal or warning observable at window 22 that a fresh complete replacement charge of material A and B is required.

It is to be emphasized that any desired ion exchange material may be used as the major bed or cartridge A. The value of attaining this result is manifest. Low cost competitive ion-exchange products can be used, making it possible to obtain the same economic operations as is available to users of the usual expensive electrical instruments or equipment. In addition, by the use of single components in the indicating layer, sharp and distinct color changes are obtainable. Also such sufficient flexibility in allowing the use of a wide variety of ion-exchange materials, makes it practical to attain efficiencies, performances, and variations in mixture and layers.

It is to be understood that nothing contained herein shall be construed as restricting this invention provided the major bed or charge of the column contains an excess of a complementary ion-exchanger to exhaust the color-changing ion-exchange material in the indicating layer.

What is claimed is:

1. Water purifying means having an inlet and an outlet and including active cation exchange material and active anion exchange material for mineral removal plus a sufficient excess active cation exchange material in combination with a single and separate indicating layer of active color-changing dyed anion exchange material disposed between the first-mentioned material and the outlet, said excess active cation exchange material functioning to exhaust said anion indicating layer.

2. Water purifying means having an inlet and an outlet and including active cation exchange material and active anion exchange material for mineral removal plus a sufficient excess active anion exchange material in combination with a single and separate indicating layer of active color-changing dyed cation exchange material disposed between the first-mentioned material and the outlet, said excess active anion exchange material functioning to exhaust said cation indicating layer.

3. Water purifying means having an inlet and an outlet and including active cation exchange material and active anion exchange material for mineral removal, in combination with a single and separate indicating layer of active cation exchange material properly admixed with active color-changing dyed anion exchange material disposed between the first-mentioned material and the outlet, said first-mentioned active cation exchange material being in sufficient excess to provide exhaustion of anion exchange material in the indicating layer.

4. Water purifying means having an inlet and an outlet and including active cation exchange material and active anion exchange material for mineral removal, in combination with a single and separate indicating layer of active anion exchange material properly admixed with active color-changing dyed cation exchange material disposed between the first-mentioned material and the outlet, said first-mentioned active anion exchange material being in sufficient excess to provide exhaustion of cation exchange material in the indicating layer.

5. Water purifying means comprising a container constructed at least with a section of transparent material and provided with an inlet and an outlet, a major mineral separation bed of cation and anion exchange material between said inlet and said outlet, a single and separate indicating layer of active color-changing dyed anion exchange material disposed adjacent the transparent section of said container whereby exhaustion of said bed is indicated by color change in said indicating layer observed through said transparent section.

6. Water purifying means comprising a container constructed at least with a section of transparent material and provided with an inlet and an outlet, a major mineral separation bed of cation and anion exchange material between said inlet and said outlet, a single and separate indicating layer of active color-changing dyed cation exchange material disposed adjacent the transparent section of said container whereby exhaustion of said bed is indicated by color change in said indicating layer observed through said transparent section.

7. Water purifying means comprising a container constructed at least with a section of transparent material and provided with an inlet and an outlet, a major mineral separation bed of cation and anion exchange material between said inlet and said outlet, a single and separate indicating layer of active cation exchange material properly admixed with active color-changing dyed anion exchange material disposed adjacent the transparent section of said container and between said bed and said outlet, whereby exhaustion of said bed is indicated by color change in said indicating layer observed through said transparent section.

8. Water purifying means comprising a container constructed at least with a section of transparent material and provided with an inlet and an outlet, a major mineral separation bed of cation and anion exchange material between said inlet and said outlet, a single and separate indicating layer of active anion exchange material properly admixed with active color-changing dyed cation exchange material disposed adjacent the transparent section of said container, and between said bed and said outlet, whereby exhaustion of said bed is indicated by color change in said indicating layer observed through said transparent section.

References Cited in the file of this patent

UNITED STATES PATENTS

| | | |
|---|---|---|
| 1,704,925 | Robertson | Mar. 12, 1929 |
| 2,781,312 | Klumb et al. | Feb. 12, 1957 |

OTHER REFERENCES

Technical Bulletin of the Rohm and Haas Co., Washington Square, Phila. 5, Pa., entitled, "Self-Indicating Amberlite for Monobed Deionization," dated May 1950.